United States Patent [19]

Mihirogi

[11] 4,106,600

[45] Aug. 15, 1978

[54] CURRENT COLLECTING SYSTEM FOR VEHICLE

[75] Inventor: Kiyoshi Mihirogi, Odawara, Japan

[73] Assignee: Japan Air Lines, Co., Ltd., Tokyo, Japan

[21] Appl. No.: 785,541

[22] Filed: Apr. 7, 1977

[30] Foreign Application Priority Data

Feb. 28, 1977 [JP] Japan .................... 52-020193

[51] Int. Cl.² .............................. B60L 5/08
[52] U.S. Cl. .................... 191/59.1; 191/53; 191/57; 191/60.2
[58] Field of Search ............... 174/12 R, 12 G, 12 F; 191/45 R, 53, 55, 57, 58, 59, 59.1, 60.2, 34; 200/81 R, 81.5, 83 D, 83 Y; 339/35; 73/4 R, 368, 368.1

[56] References Cited

U.S. PATENT DOCUMENTS 2,656,429 10/1953 Tietjen .................... 200/81.5

FOREIGN PATENT DOCUMENTS 552,048 1/1958 Canada .................... 200/83 D
825,277 10/1969 Canada .................... 200/83 D Primary Examiner—Stephen G. Kunin
Attorney, Agent, or Firm—Armstrong, Nikaido, Marmelstein & Kubovcik

[57] ABSTRACT

An improved current collecting system for a vehicle which, when collecting a current from a power supply member such as trolley wire, controls the engagement of contact members with the power supply member. With this invention, damages of the power supply member attributable to arcs and the like are precluded.

6 Claims, 6 Drawing Figures

CURRENT COLLECTING SYSTEM FOR VEHICLE

BACKGROUND OF THE INVENTION

The present invention relates to a current collecting system for supplying power to vehicles such as railway vehicles and particularly to high-speed vehicles such as linear motor cars.

Railway and other vehicles powered by electricity are fed with electric power from power supply members installed on the ground including trolley wires. A problem observed in the current collection of this type is that the contact members of the current collecting system are sometimes brought out of engagement with the power supply member. As is well known in the art, this occurs more frequently as the travelling speed of the vehicle is increased. Disengagement of the contact members from the power supply member brings about drawbacks in that the power supply is irregular and hence unstable, that arcs generated upon disengagement melt the contact surfaces and form projections and recesses on the surfaces of the power supply member with which the contact members are held in sliding engagement, and that the sliding surfaces of the power supply member are further damaged owing to this irregularity, the power supply member being broken in the worst case.

To avoid the problem discussed above, there has been increased precision in the machining and installing of a power supply member so that its sliding surfaces may be straightened and to reduce the weights of movable members included in a current collecting system while increasing the contact pressure to thereby improve the following ability as a result of a decrease in the period of natural vibration. Power supply members are available in two different forms: wires and rigid members. Wires can be installed with an increased precision relatively easily, but an increase in the contact pressure of contact members engaged with the wires will not only promote wear of the contact members and the wires but also result in bowing and tensioning of the wires which may consequently create dangerous conditions. On the other hand, it is not easy to install rigid power supply members while minimizing the irregularity of their alignment, nor to maintain their quality of surface finish after the installation, and the contact pressure of the contact members though it can be sufficiently increased is directly reflected by wear of the contact members. Thus, the upper limit of the speed in which current collection can be done with prior art techniques is in the order of 230–250 km/hr in terms of vehicle speed.

SUMMARY OF THE INVENTION

An object of the present invention is to provide a current collecting system which, despite the use of a power supply member which can be readily installed and maintained with conventional techniques, minimizes the wear of contact members and causes the contact members to positively follow the power supply member without becoming disengaged.

To achieve this objective, a current collecting system for a vehicle according to the present invention comprises a power supply member having two parallel surfaces, at least one expander unit which is inflatable with a pressurized medium, at least a pair of support members positioned in such a manner as to hold said inflatable expander unit therebetween and each having one end thereof pivotably connected to said vehicle, a pair of contact members carried on the other ends of said support members to hold said power supply member therebetween, and control means which brings said contact members into and out of pressing engagement with said power supply member when said expander unit is inflated and deflated, respectively.

BRIEF DESCRIPTION OF THE DRAWINGS

These and other objects, features and advantages of the present invention will be understood from the following description taken in conjunction with the accompanying drawings, in which.

DESCRIPTION OF THE PREFERRED EMBODIMENTS

The present invention will now be described with reference to the accompanying drawings.

Figure 1:
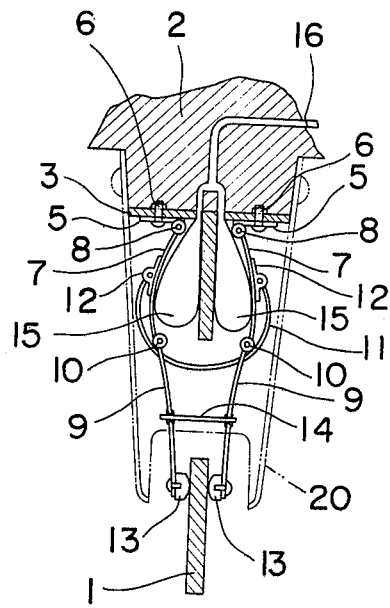
FIG. 1 is a partly sectional front view of a current collecting system according to a preferred embodiment of the present invention.
Figure 2:
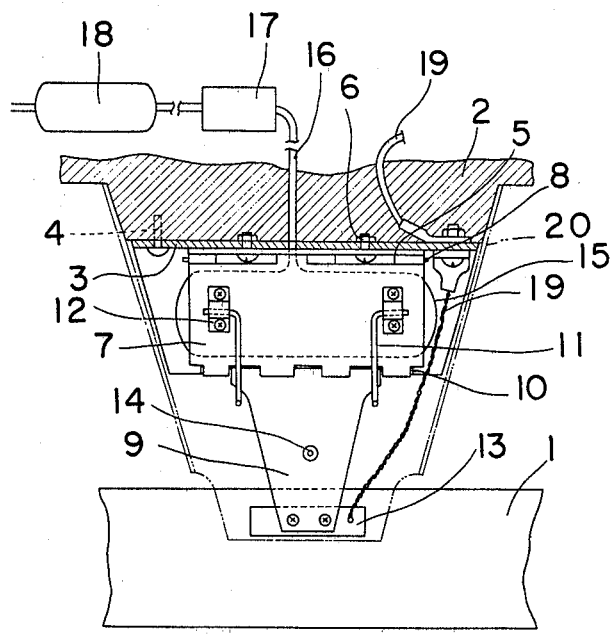
FIG. 2 is a partly sectional side elevation of the system shown in FIG. 1.

Referring to FIGS. 1 and 2, reference numeral 1 designates a rigid power supply member extending in parallel with rails (not shown). Designated 2 is a nonconductive support rigidly mounted to a vehicle body (not shown) for supporting a current collecting assembly which will be described hereinafter. Secured to the support 2 by means of screws 4 is a mounting plate 3 formed of an insulating material and having a generally T-shaped cross-section as viewed in FIG. 1. The plate 3 has mounted plates 5 securely on its horizontal portion through bolt and nut assemblies 6 while, in turn, a pair of presser plates 7 are pivotably mounted to the plates 5 by pins 8 in face-to-face relation with each other. Leaf springs 9 are mounted at their upper ends pivotably to the lower ends of the plates 7 by means of pins 10, respectively. Denoted 11 are generally U-shaped return springs each having opposite ends fixed to the plates 7, substantially midway between vertically opposite ends of the outer surfaces of the plates 7 through the metal fixtures 12. The plates 7 are therefore constantly urged toward each other by the action of the cooperating return springs 11. Each of the leaf springs 9 has a fixed contact member 13 at its lower end. A rod 14 is passed through and loosely fitted at its opposite end portions to substantially the mid portions of the leaf springs between vertically opposite ends of the leaf springs 9, thereby maintaining a predetermined spacing between said intermediate portions of the leaf springs 9. Interposed between the vertical portion of the T-shaped plate 3 and the opposite presser plates 7 are expander units 15 which are inflatable upon admission of a pressurized charge of air, and in this way the plates 7 are so positioned as to hold the expander units 15 from opposite sides. The expander units 15 are respectively connected with a pressure regulating unit 17 by way of a conduit 16 mounted to the vehicle body. The pressure regulator 17 is connected with an air reservoir 18. Further denoted 19 are lead wires through which power collected by the members 13 is fed and 20 is a cover provided according to requirement to protect the assembly against the weather and reduce wind resistance.

Figure 3:
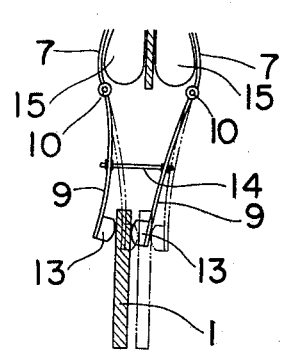
FIG. 3 is a fragmentary partly sectional front view showing lateral displacement of support members for contact members following lateral movement of a power supply member included in the embodiment.
Figure 4:
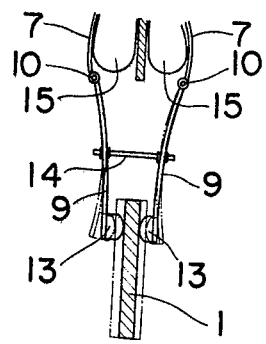
FIG. 4 is a fragmentary partly sectional front view showing a case wherein the power supply member bears a machining error.

In operation, pressurized air is fed from the reservoir 18 through the pressure regulator 17 and inflates the units 15. The inflation of these units 15 moves the plates 7 away from each other against the action of the return springs 11 whereupon the contact members 13 are urged toward each other with the aid of the fulcrum action of opposite end portions of the rod 14, which is free to move relative to the leaf springs 9. Consequently, the power supply member 1 is held between the contact members 13 with forces which are commonly proportional to the pressure of air introduced into the units 15. Since in this instance the forces exerted by the contact members 13 onto the power supply member 1 are in balance with each other, the load resulting from the contact pressure does not create lateral oscillations of the member 1 and, hence, only a moderate rigidity of supports will suffice for the power supply member 1. In case where a lateral displacement of the power supply member 1 occurs as viewed in FIG. 3, it should be followed only by the component parts disposed below the pins 10 so that lateral oscillations can be followed in a positive way even at high travelling speeds of the vehicle by reducing the weights of the leaf springs 9, rod 14 and contact members 13. Meanwhile, machining errors may be encountered in the manufacture of the power supply members. According to the present invention, such errors can be compensated for by the resilient action of the leaf springs 9 holding the power supply member 1 therebetween as seen in FIG. 4. Thus, the contact members 13 remain in positive engagement with the power supply member 1 even during high speed operation of the vehicle.

Figure 5:
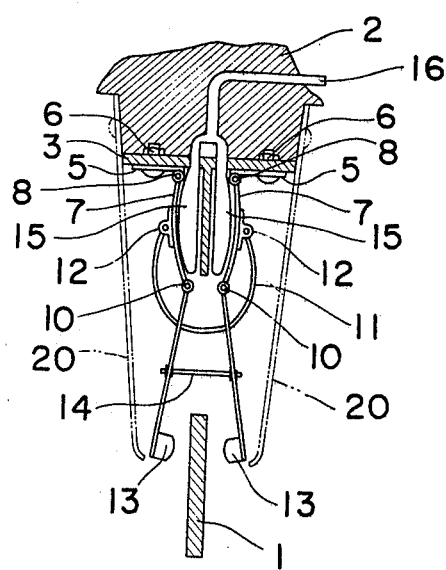
FIG. 5 is a partly sectional front view of the system which is in an inoperative position.

When now the pressure of the air is lowered the return springs 11 resiliently urge the pressure plates 7 toward each other thereby deflating the units 15. The movements of these plates 7 are transferred to the corresponding leaf springs 9 whereby the contact members 13 are moved away from each other and thus disengaged from the power supply member 1 by the fulcrum action of the opposite end portions of the rod 14. It will thus be understood that, since the contact pressure of the members 13 with the power supply member 1 is adjustable by varying the air pressure in the units 15, unnecessary wear of the contact members 13 can be avoided if the contact pressure is controlled according to the travelling speed of the vehicle within a range causing no disengagement from the power supply member 1. It will also be seen that, when an inertia run is reached by the vehicle, the pressure in the units 15 may be reduced to such an extent that the contact members 13 are disengaged from the power supply member 1 as viewed in FIG. 5 with a view to further enhancing the avoidance of wear of the members 13.

Figure 6:
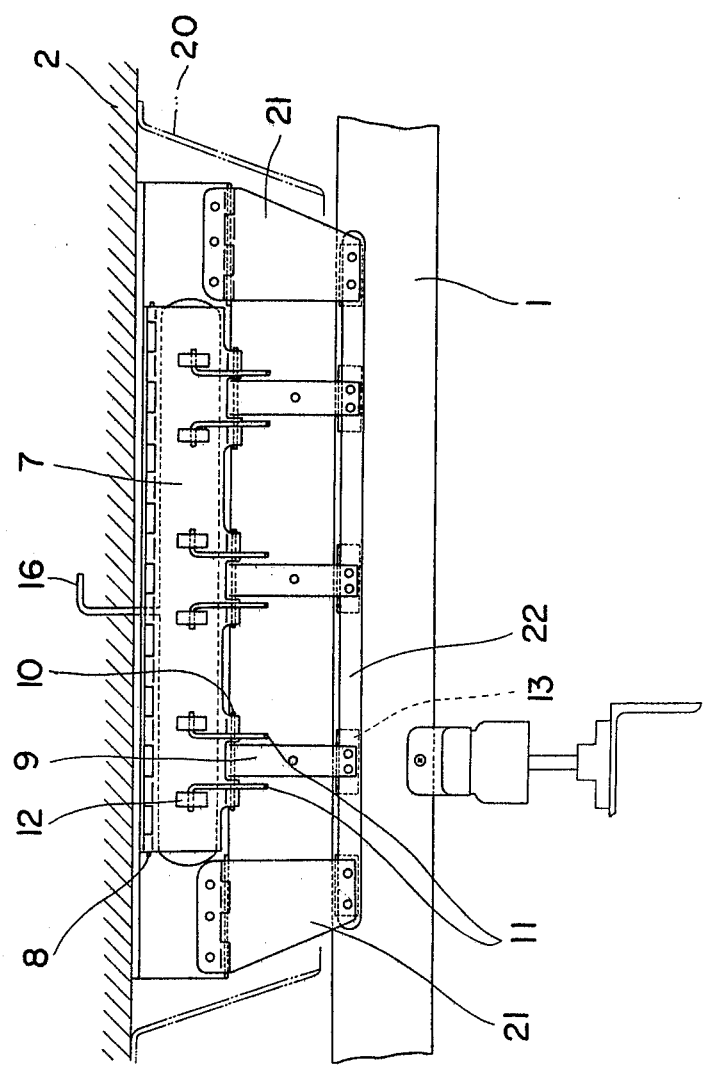
FIG. 6 is a partly sectional side elevation of another embodiment of the present invention.

While the current collecting system has been shown and described as having a pair of contact members, it may include three parallel pairs of contact members if three-phase current collection is desired and, to increase the current capacity, several pairs of such contact members may be arranged in series. FIG. 6 illustrates another embodiment of the present invention in which three pairs of contact members 13 are arranged in series for the purpose of increasing the current capacity. The system shown in FIG. 6 includes, in addition to the three contact member pairs, two pairs of auxiliary arms 21 rigidly mounted to the vehicle body on opposite sides with respect to said contact member pairs in the longitudinal direction of said power supply member in such a manner that the arms 21 in each pair hold the power supply member therebetween. The contact members 13 and the arms 21 on corresponding sides with respect to the power supply member 1 are connected with one another by means of elongated leaf springs 22 which extends in parallel to said power supply member, respectively. The size of the leaf springs 9 shown in FIG. 6 can be reduced and, hence, the entire system can be further enhanced as a light weight construction.

It will now be appreciated from the foregoing that, since according to the present invention a current collecting system has contact members which are controlled by an air pressure developed in inflatable units and hold a power supply member therebetween, the contact pressure of the contact members can be adjusted or the contact members can be disengaged from the power supply member in accordance with travelling speed and/or other conditions of a vehicle with which the system is associated and, thus, wear of the contact members can be effectively reduced. It will also be appreciated that, because the contact members hold the power supply member from opposite sides with mutually balanced forces, they will follow any possible lateral oscillations of the power supply member, and that the system is obtainable with a light weight construction.

What is claimed is:

1. A current collecting system for a vehicle, comprising a power supply member having two parallel surfaces, at least one expander unit which is inflatable with a pressurized medium, at least a pair of support members adapted to hold said inflatable expander unit therebetween and each having one end thereof pivotably connected to said vehicle, a pair of contact members each carried on the other ends of said support members to hold said power supply member therebetween, and control means which brings said contact members into and out of pressing engagement with said power supply member when said expander unit is inflated and deflated, respectively.

2. A system as set forth in claim 1, wherein each of said support members comprises a presser plate which is pivoted at one end to said vehicle in face-to-face relation with the other, and a leaf spring pivoted at one end to the other end of said presser plate and at the other end rigidly connected with one of said contact members.

3. A system as set forth in claim 2, wherein said control means comprises pressing means for resiliently pressing said presser plates inwardly toward each other and fulcrum means for supporting intermediate portions of said leaf springs while maintaining a predetermined spacing between said intermediate portions of said leaf springs.

4. A system as set forth in claim 3, wherein said pressing means comprises at least one generally U-shaped return spring having opposite ends thereof mounted on said pressure plates substantially midway between the vertically opposite ends of the outer surfaces of said presser plates.

5. A system as set forth in claim 3, wherein said fulcrum means comprises a rod the opposite ends of which are passed through and loosely fitted to said leaf springs substantially midway between the vertically opposite ends of said leaf springs.

6. A system as set forth in claim 1, further comprising two pairs of auxiliary arms located on opposite sides with respect to said pair of contact members in the longitudinal direction of said power supply member, each said pair of auxiliary arms being rigidly mounted to said vehicle so as to hold said power supply member therebetween, and a pair of elongated leaf springs each elongated leaf spring extending in parallel to said power supply member, said elongated leaf springs connecting said contact members of said auxiliary arms on the corresponding sides of said power supply member.

* * * * *